(12) United States Patent
Cern et al.

(10) Patent No.: US 7,158,003 B2
(45) Date of Patent: Jan. 2, 2007

(54) CONSTRUCTION OF MEDIUM VOLTAGE POWER LINE DATA COUPLERS

(75) Inventors: Yehuda Cern, Brookline, MA (US); Ramdas S. Rao, Brighton, MA (US)

(73) Assignee: Ambient Corporation, Newton, MA (US)

( * ) Notice: Subject to any disclaimer, the term of this patent is extended or adjusted under 35 U.S.C. 154(b) by 121 days.

(21) Appl. No.: 10/429,169

(22) Filed: May 2, 2003

(65) Prior Publication Data
US 2003/0222748 A1 Dec. 4, 2003

Related U.S. Application Data

(60) Provisional application No. 60/377,731, filed on May 3, 2002.

(51) Int. Cl.
*H01F 17/06* (2006.01)
(52) U.S. Cl. ........................... 336/175; 336/176
(58) Field of Classification Search ................ 336/90, 336/175–176
See application file for complete search history.

(56) References Cited

U.S. PATENT DOCUMENTS

| 2,761,911 | A | * | 9/1956 | Camras ...................... 360/128 |
| 3,626,344 | A | * | 12/1971 | Shaternikov et al. ......... 336/73 |
| 4,030,058 | A | | 6/1977 | Riffe et al. ................... 336/92 |
| 5,680,028 | A | | 10/1997 | McEachern .................... 320/2 |
| 6,028,413 | A | | 2/2000 | Brockmann ................. 320/108 |
| 6,268,787 | B1 | * | 7/2001 | Onizuka ...................... 336/92 |

* cited by examiner

*Primary Examiner*—Ramon M. Barrera
(74) *Attorney, Agent, or Firm*—Ohlandt, Greeley, Ruggiero & Perle, LLP (57) ABSTRACT

There is provided an inductive coupler for coupling a data signal to a phase line of a power line. The inductive coupler includes a split magnetic core having an aperture formed by an upper magnetic core and a lower magnetic core. The aperture permits the phase line to pass therethrough as a primary winding, the upper magnetic core is for making electrical contact with an outer surface of the phase line, and the lower magnetic core makes electrical contact with the upper magnetic core.

34 Claims, 10 Drawing Sheets

CONSTRUCTION OF MEDIUM VOLTAGE POWER LINE DATA COUPLERS

CROSS REFERENCE TO RELATED APPLICATIONS

The present application is claiming priority of U.S. Provisional Patent Application Ser. No. 60/377,731, filed on May 3, 2002.

BACKGROUND OF THE INVENTION

1. Field of the Invention

The present invention relates to the physical construction of inductive power line data couplers.

2. Description of the Related Art

Inductive couplers are used for coupling data signals onto and off of medium overhead voltage power lines. Such couplers operate in the presence of voltage and current stresses present on actual power lines. For such a coupler to be accepted by power utilities, it must pass stress testing for conditions including steady state ac withstand voltage, freedom from partial discharge and corona, lightning surges as expressed by Basic Impulse Loading pulses, and switching transients.

SUMMARY OF THE INVENTION

A first embodiment of the present invention is an inductive coupler for coupling a data signal to a phase line of a power line. The inductive coupler includes a split magnetic core having an aperture formed by a first section and a second section. The aperture permits the phase line to pass there through as a primary winding, the upper magnetic core is for making electrical contact with an outer surface of the phase line, and the lower magnetic core makes electrical contact with the upper magnetic core.

Another embodiment of the present invention is an inductive coupler for coupling a data signal to a phase line of a power line. The inductive coupler includes (a) a split magnetic core having an aperture formed by a first section and a second section in which the aperture permits the phase line to pass therethrough as a primary winding, and (b) a secondary circuit having a winding passing through the aperture as a secondary winding and providing a low impedance path for power frequency to an electrical ground.

DESCRIPTION OF THE INVENTION

Figure 1A:
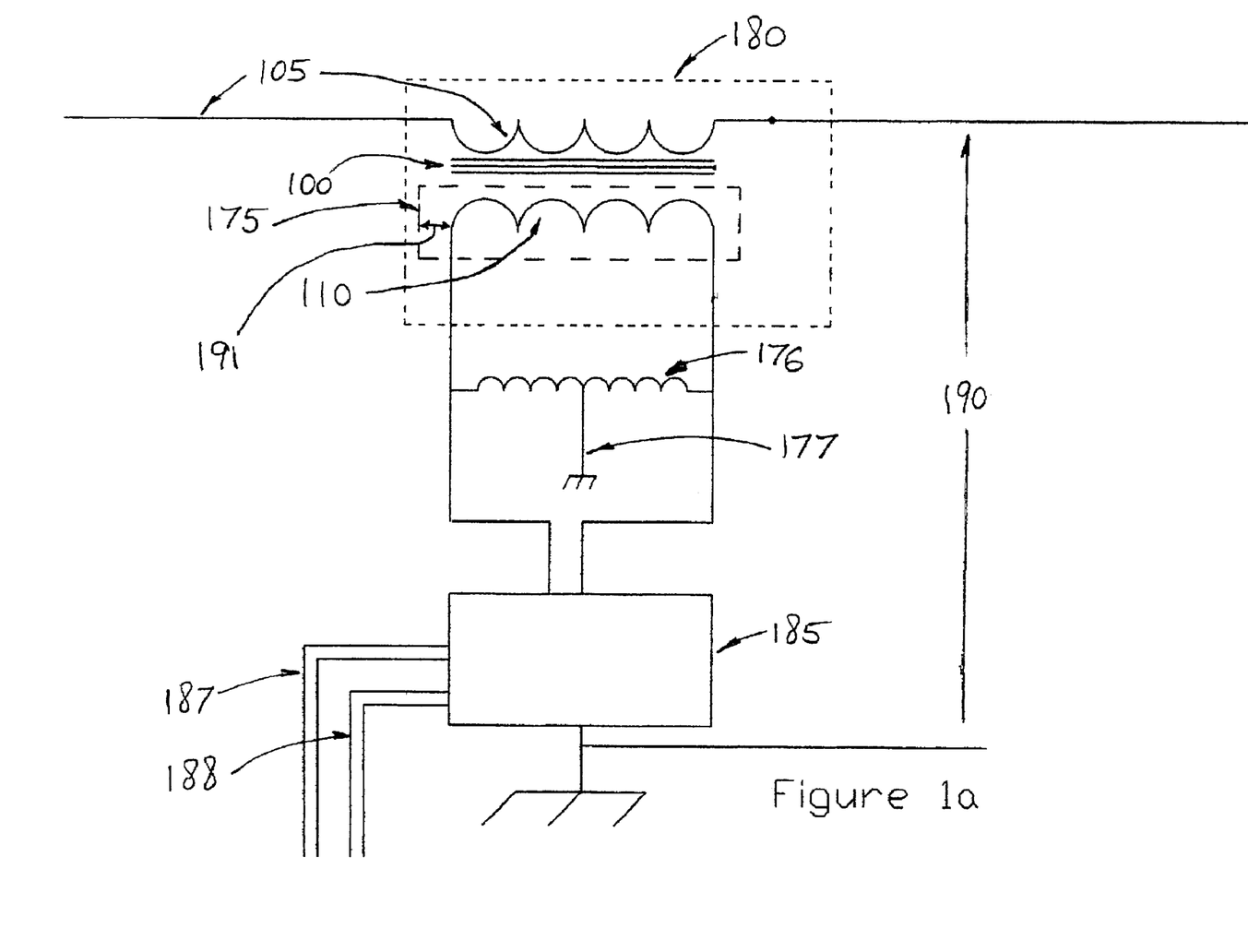
FIG. 1a is a schematic showing voltage stress distribution.

FIG. 1a shows schematically an inductive coupler 180 placed on an energized phase line 105 of a power line. Inductive coupler 180 is for coupling a high frequency communications signal between phase line 105 and a communications device, such as a modem 185.

Phase line 105 serves as a primary winding for inductive coupler 180. Inductive coupler 180 includes a magnetic core 100, a secondary winding 110, and secondary insulation 175. Inductive coupler 180 is connected to modem 185, which is, in turn, connected to power wires 187 and/or signal wires 188 at or near ground potential.

Phase line 105 may be either an insulated conductor or an uninsulated conductor. In one embodiment, magnetic core 100 is in electrical contact with an outer surface of phase line 105, thus energizing magnetic core 100 to the same electrical potential as the outer surface of phase line 105 at the point or points of contact between magnetic core 100 and the outer surface of phase line 105. This embodiment is suitable for a case where voltage on phase line 105 is a medium voltage, e.g., in excess of about 2000 volts AC. In another embodiment, magnetic core 100 is not necessarily in electrical contact with the outer surface of phase line 105. This embodiment is suitable for a low voltage on phase line 105, e.g., less than or equal to 600 volts AC. For cases of phase line 105 having voltages between 600 and 2000 volts AC, either embodiment can be employed.

Secondary winding 110 is grounded through a high frequency choke 176 and wire 177. This arrangement positions a phase voltage 190 and resulting voltage stress 191 solely on secondary insulation 175. Any fault current due to failure of secondary insulation 175 or flashover from phase line 105 to secondary winding 110 is directly drained to ground via choke 176 and wire 177, and not routed through modem 185.

Figures 1B, 1C:
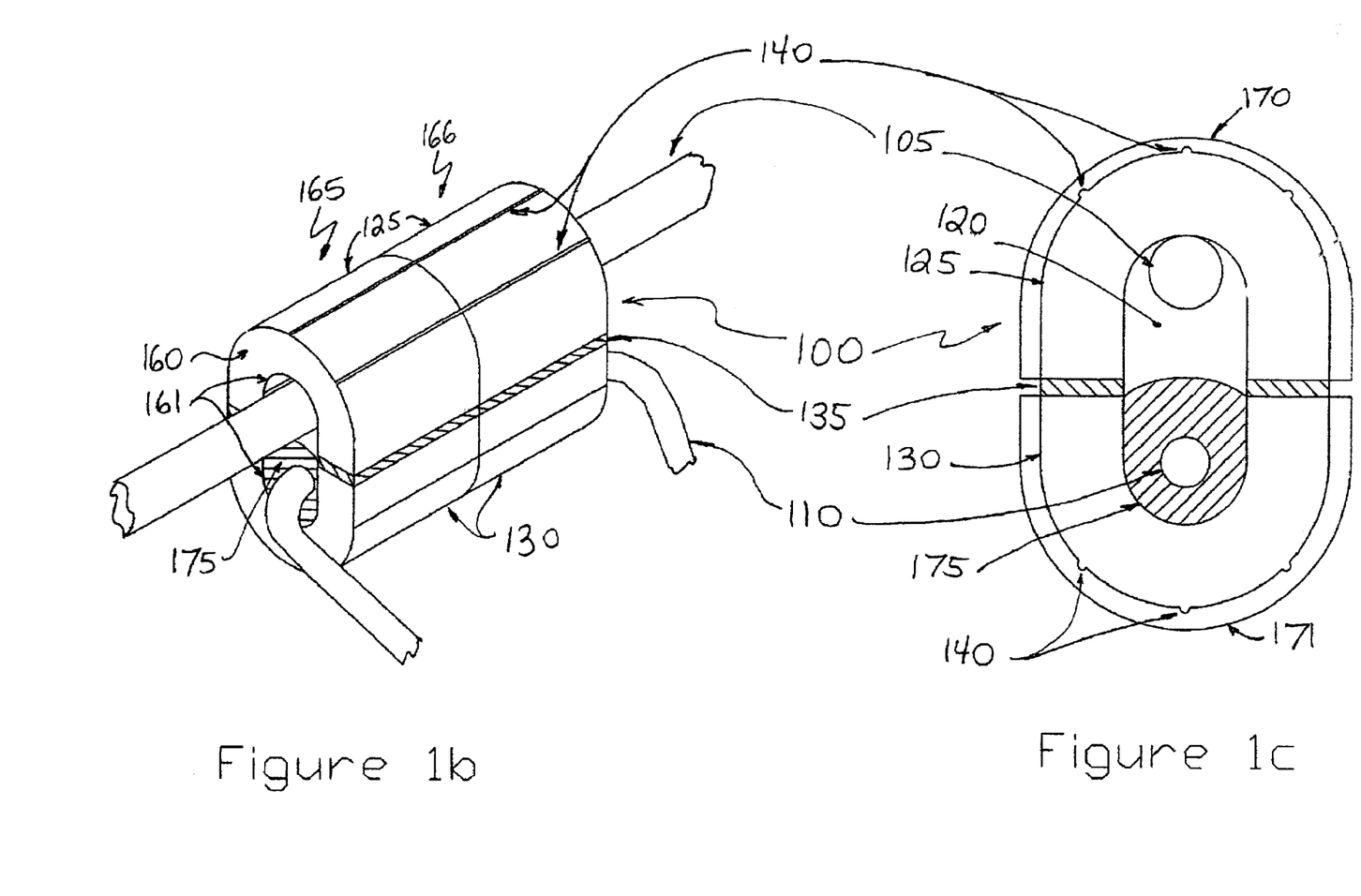
FIGS. 1b and 1c shows a cross-section and isometric depiction, respectively, of magnetic cores and placement of primary and secondary windings within the cores.

FIG. 1b shows an isometric rendering of magnetic core 100, comprising core sets 165 and 166. FIG. 1c shows a cross section with the addition of a plastic packaging material, i.e., plastic layers 170 and 171, that bind core sets 165 and 166 together. Magnetic core 100 is thus a composite split core that can be used in an inductive coupler and allows for placement of the inductive coupler over an energized power line, e.g., energized phase line 105.

Magnetic core 100 includes an aperture 120. Phase line 105 passes through an upper section of aperture 120. Secondary winding 110 and secondary insulation 175 pass through a lower section of aperture 120. Note that secondary winding 110 may be routed through aperture 120 a single time, or may be configured with a plurality of turns by being wound around a portion of magnetic core 100 and routed through aperture 120 a plurality of times.

Considering that phase line 105 may be of a large diameter, and that secondary insulation 175 may be a thick layer of insulation, aperture 120 is oblong or oval. Such an oblong or oval shape can be achieved, for example, by configuring split core 100 with a first section and a second section, i.e., an upper core 125 and a lower core 130, that are horseshoe-shaped to provide a racecourse shape for magnetic core 100, thereby accommodating phase line 105 being large and secondary insulation 175 being thick.

Upper and lower cores 125 and 130 are magnetic and have a high permittivity. Upper and lower cores 125 and 130 act as conductors to high voltage since voltage drop is inversely proportional to capacitance and capacitance is proportional to permittivity. Upper core 125 is in contact with phase line 105, and thus upper core 125 is energized so as to avoid intense electric fields near the phase line 105, thus also avoiding local discharges through the air.

The magnetic circuit of core 100 also may include non-magnetic segments, commonly termed air gaps, containing a gapping material 135. Gapping material 135 is electrically conductive or resistive, so as to ensure that lower core 130 has an electrically conductive path to phase line 105, and is energized, thus eliminating any strong local electric fields in the vicinity of gapping material 135.

Upper core 125 may not make effective physical contact with phase line 105, and a voltage difference between these two bodies may cause electrical discharge, creating electrical noise.

Figure 1D:
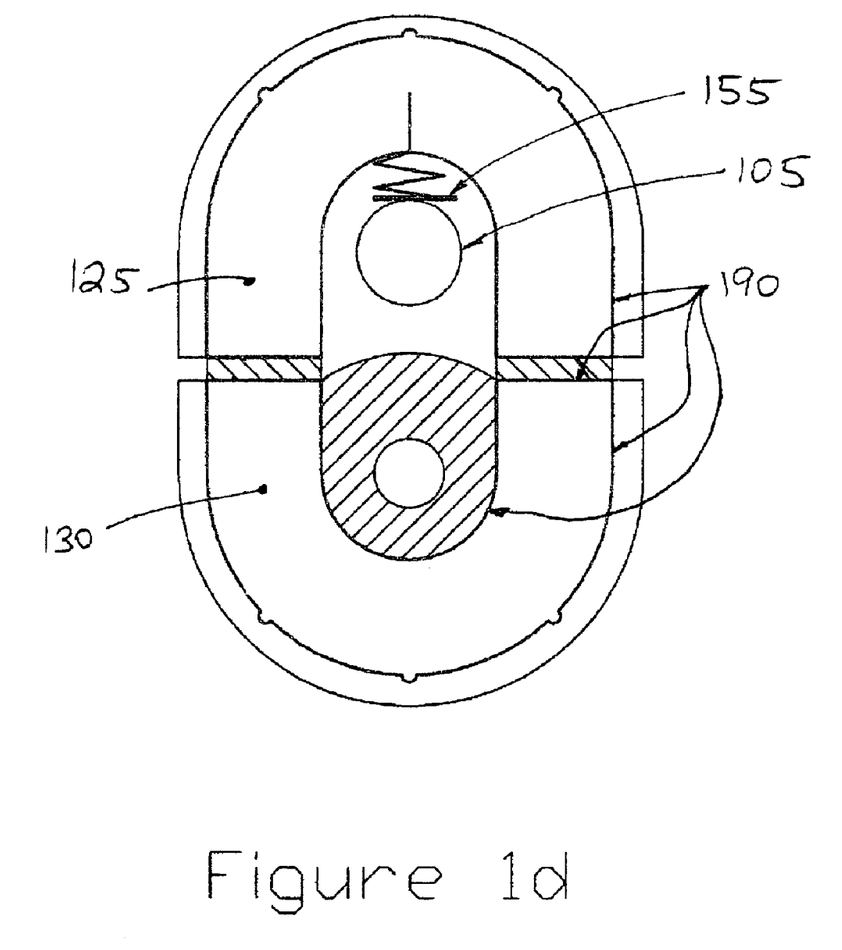
FIG. 1d shows a contact spring for ensuring electrical contact between phase line and magnetic core.

FIG. 1d shows electrically conductive coating 190, applied to all surfaces of upper and lower cores 125 and 130. This coating facilitates electrical contact between upper core 125 and phase line 105, and electrical contact between upper core 125 and lower core 130.

An inductive coupler may be mechanically supported independent of phase line 105, and may pass through upper core 125 without touching upper core 125. To ensure an electrical contact between upper core 125 and phase line 105, a springy conductive body 155 is mounted in electrical contact with upper core 125, and contacts phase line 105. Springy conductive body 155 is designed to accommodate phase line 105 having a wide range of diameters, such as 6 gauge to 500 thousand circular mil conductors.

Referring again to FIGS. 1b and 1c, magnetic core 100 may also include longitudinal spines 140 on the backs of upper and lower cores 125 and 130. Upper core 125 is molded into plastic layer 170, and lower core 130 is molded into plastic layer 171. Longitudinal spines 140 improve the grip between upper and lower cores 125 and 130 and their respective plastic layers 170 and 171, and stabilize the positioning of each core 125 and 130 within that plastic layer 170 or 171, respectively.

Upper and lower cores 125 and 130, and secondary winding 110, should be coated with a semi-conducting material to eliminate strong local electrical fields at their surfaces.

As illustrated in FIG. 1b, core sides 160 are perpendicular to phase line 105 and secondary winding 110. There is an electric field concentration at inner edges 161 of core sides 160, where phase line 105 exits upper core 125 and where secondary winding 110 exits lower core 130.

Figure 2:
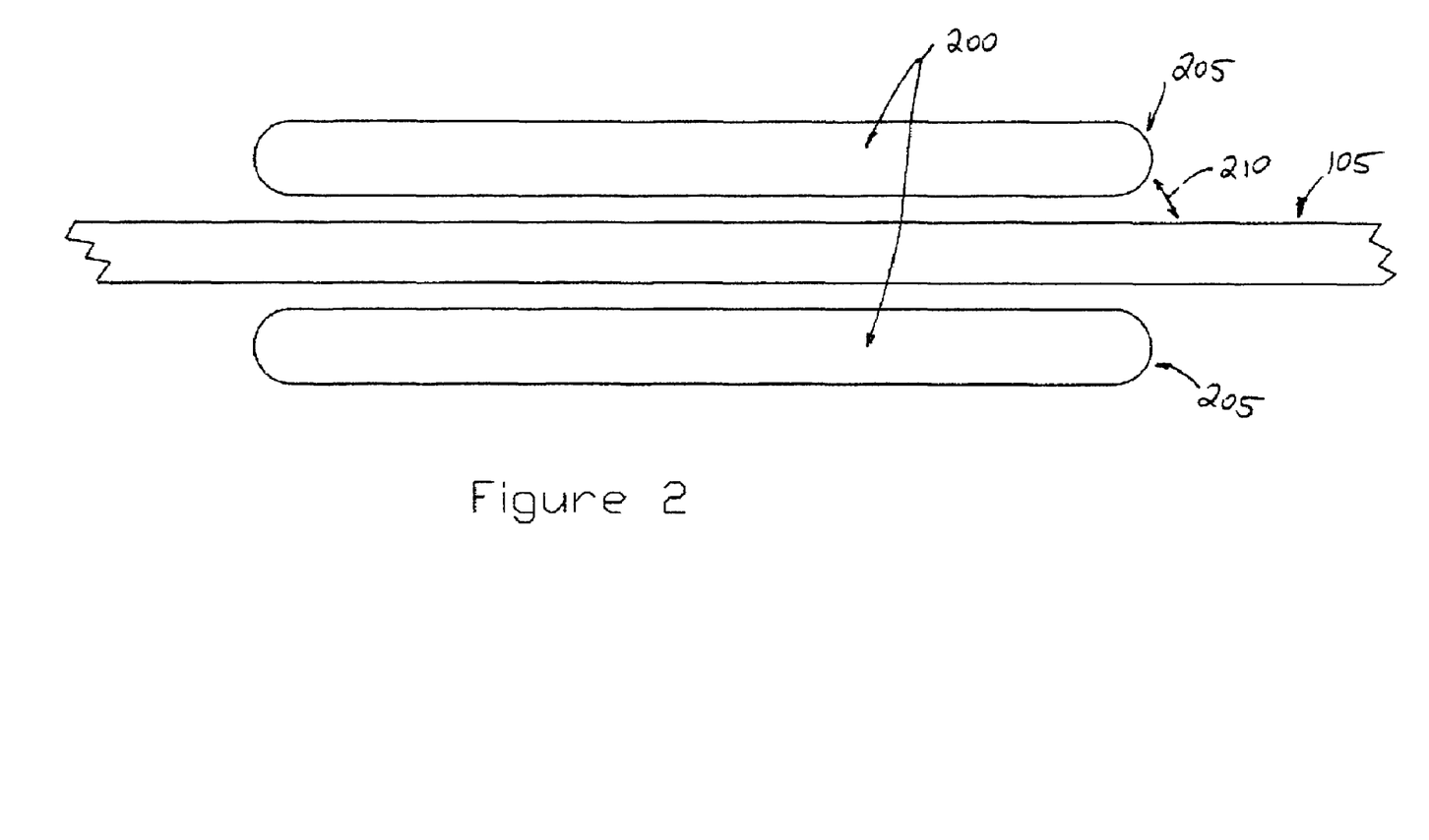
FIG. 2 shows how cores may be rounded to reduce local electric field stress.

FIG. 2 shows a view of pole faces 200 that may be employed for upper core 125 and lower core 130, having outer surfaces 205 in a rounded convex shape. For example, this shape reduces field concentration at an end of pole face 200 by providing a spacing, i.e., distance 210, between phase line 105 and outer surfaces 205 that increases gradually as phase line 105 exits upper core 125. Similarly, such rounding of the ends of lower core 130 reduces field concentration where secondary winding 110 exits lower core 130.

Figure 3A:
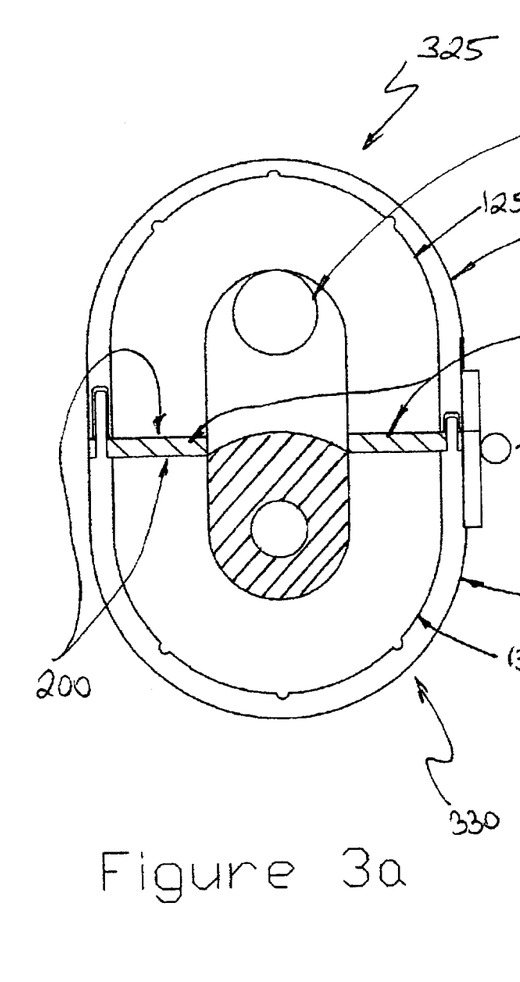
FIGS. 3a and 3b shows a configuration of an upper core and a lower core hinged together with alignment pins.

FIG. 3a shows a configuration of an upper core 125 mounted to a lower core 130 with a hinge 310. When the unit is hinged open, as shown in FIG. 3b, upper and lower cores 125 and 130 can be visualized as a set of jaws.

Upper and lower cores 125 and 130 are held in plastic layers 170 and 171, respectively. An upper core body 325 comprises upper core 125 and plastic layer 170, and a lower core body 330 comprises lower core 130 and plastic layer 171. Plastic layer 171 is equipped with protruding pins 320. Plastic layer 170 is designed with matching depressions 321. Pins 320 assist in aligning lower core body 330 with upper core body 325 when the jaws are closed. As a result, pole faces 200 of cores 125 and 130 are aligned with each other to improve the performance of the magnetic circuit and increase magnetic coupling.

Figure 3B:
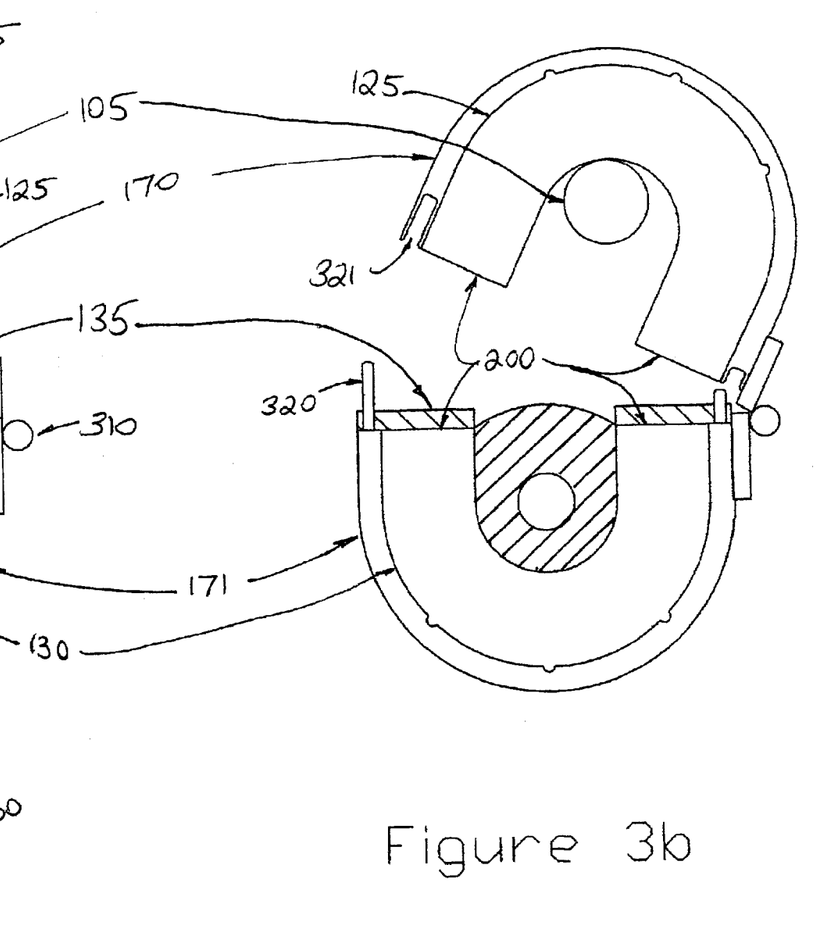

The arrangement shown in FIGS. 3a and 3b also permits gapping material 135 of various thickness to be fabricated with holes whose positions match pins 320, and whose hole diameters make an interference fit with pins 320, gripping gapping material 135 while the jaws are open. Introduction of gapping material 135 in the magnetic circuit allows upper and lower cores 125 and 130 to operate without excessive saturation for higher current levels in phase line 105 than would be allowed without gapping material 135.

Inductive couplers installed on power distribution lines are expected to function under high current conditions consistent with a utility's practices of heavily loading power wires during high demand periods. Temperatures generated in a phase conductor, as well as any high-current flux-canceling secondary winding, should be limited so as not to damage the coupler nor affect its ability to withstand current surges.

Figure 4:
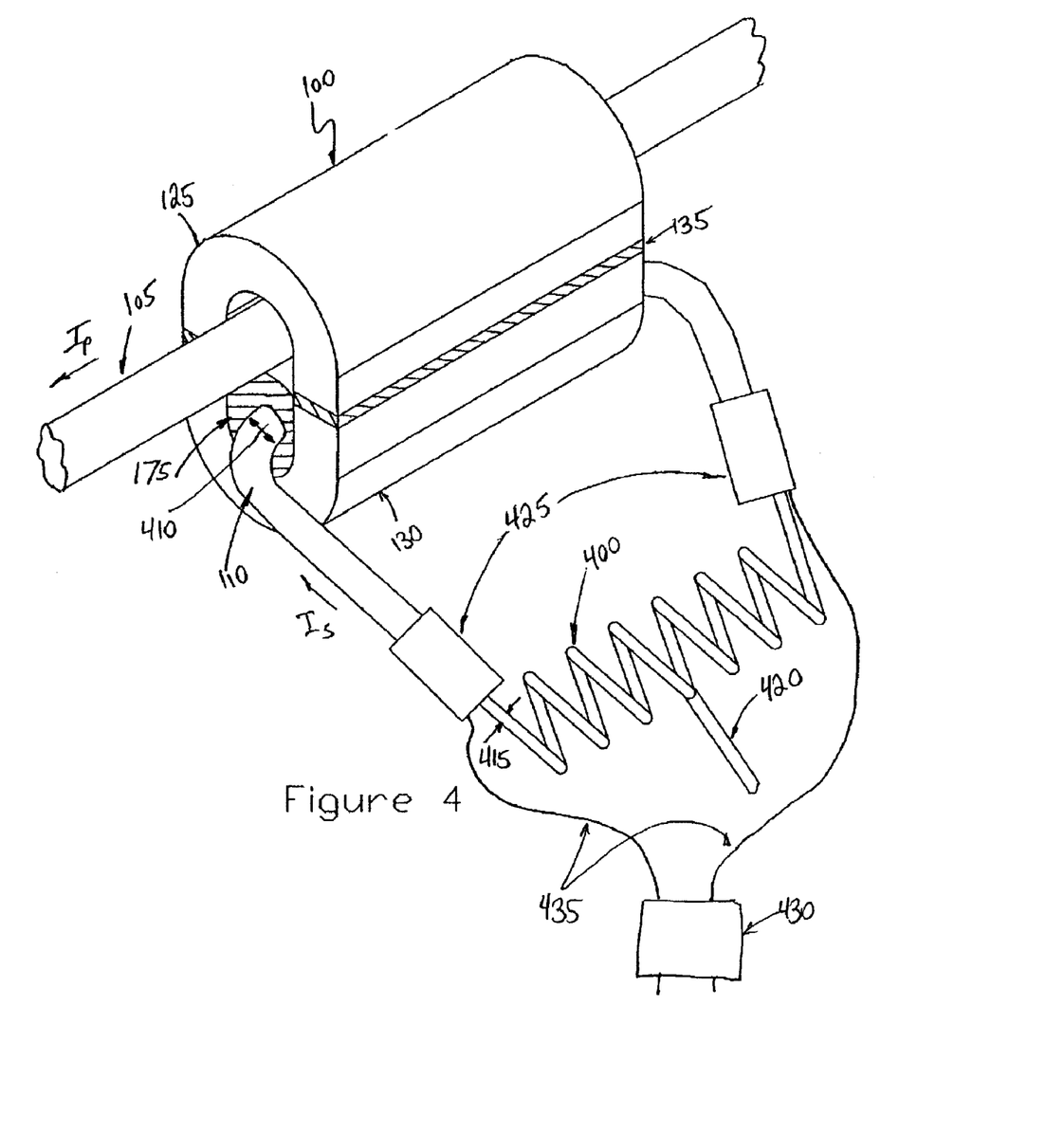
FIG. 4 shows an inductive coupler together with a flux-canceling choke.

FIG. 4 is an illustration of an inductive coupler together with a flux-canceling choke. Phase line 105 serves as a primary winding passed through magnetic core 100. A secondary circuit includes secondary winding 110, a choke inductor 400, a ground lead 420, and signal leads 435. The secondary circuit is coupled to a modem 430.

A portion of secondary winding 110 passing through magnetic core 100 is embedded in secondary insulation 175. Secondary insulation 175 has relatively low thermal conductivity. The leads of secondary winding 110 that extend beyond edges of magnetic core 100 are coated with an insulation (not shown) until the leads are distant from lower core 130. The cumulative diameter of secondary winding 110, i.e., the outer contour of secondary winding 110, is of relatively large, in the range of 10 to 13 millimeters (mm), so as to minimize the electric field at its surface. This large diameter also ensures very low resistive losses and heating for a current of up to 250 amps.

Secondary winding 110 exits from secondary insulation 175, and at some distance thereafter, a diameter 410 of a wire of secondary winding 110 could be somewhat reduced to a smaller diameter 415 by splices 425. Wire of diameter 415 is wound as a coil with a plurality of turns to form choke inductor 400.

Choke inductor 400 is a high frequency choke. That is, choke inductor 400 exhibits a high impedance at frequencies above 1 Mhz. Choke inductor 400 may have either an air core or minimal magnetic bar cores (not shown). A center tap of choke inductor 400 is connected via ground lead 420 to pole ground, which is a conductor that descends an electric pole and connects to a grounding rod.

In case of failure of secondary insulation 175 between phase line 105 and secondary winding 110, a fault current will flow. Secondary winding 110, the wire of choke 400 and ground lead 420 are robust enough to carry a fault current for a period of a few cycles of power frequency current until a protective device of the power distribution grid senses the fault and de-energizes the circuit. Ground lead 420 grounds signal leads 435 via choke inductor 400, and thus prevents any hazardous voltages from reaching modem 430 and other equipment or entity connected to the secondary circuit.

A primary current $I_p$, flowing in a typical power distribution system through phase line 105, may be considered as divided into three general current levels, referred to herein as a first current level, as second current level and a third current level. For purposes of illustration, the first current level is typically up to 150 amps. A second level might represent a range of 150 to 250 amps. A third current level may represent a current in excess of 250 amps.

Choke 400 provides a low impedance termination at power frequency to secondary winding 110. Current is induced in secondary winding 110 in a opposite direction to that of current flowing in phase line 105, thus reducing the magnetomotive force in magnetic core 100. This results in a cancellation of flux generated by the current in phase line 105 and allows operation of the inductive coupler to the second current level without excessive magnetic core saturation. Secondary winding 110 connected to choke 400 thus forms a flux canceling circuit.

The third current level, e.g., an overload above 250 amps, may generate a level of magnetomotive force that saturates magnetic core 100 and impairs coupler signal functionality. However, the coupler design ensures that the coupler is not damaged by excessive secondary current $I_s$ overheating secondary 110.

Temperature rise may be exacerbated due to the embedding of some of the secondary circuit conductors in electrical insulation material that is also thermally insulating. Excessive current flow in embedded conductors might cause excessive temperatures to develop inside the coupler insulation material and degrade its insulating properties.

A first mechanism for limiting secondary current $I_s$, is the resistance of secondary winding 110, which increases as secondary winding 110 heats up, thus reducing secondary current $I_s$. A second mechanism for limiting secondary current $I_s$ is that the resistance of choke inductor 400 may increase, reducing the ratio of $I_s$ to $I_p$. A third mechanism for limiting secondary current $I_s$ is that magnetic core 100 will saturate, limiting the magnitude of induced secondary current $I_s$. The materials from which upper and lower cores 125 and 130 are made, and the thickness of gapping material 135, can be selected for the appropriate saturation level, making the coupler fail-safe against overheating.

In an alternative embodiment, a tertiary winding may be wound around the core, and connected to a second choke coil, thus increasing a total amount of secondary and tertiary current flowing in a direction opposite from the phase line current. This embodiment may provide coupler signal functionality at a third current level, exceeding 250 amps.

Figure 5A:
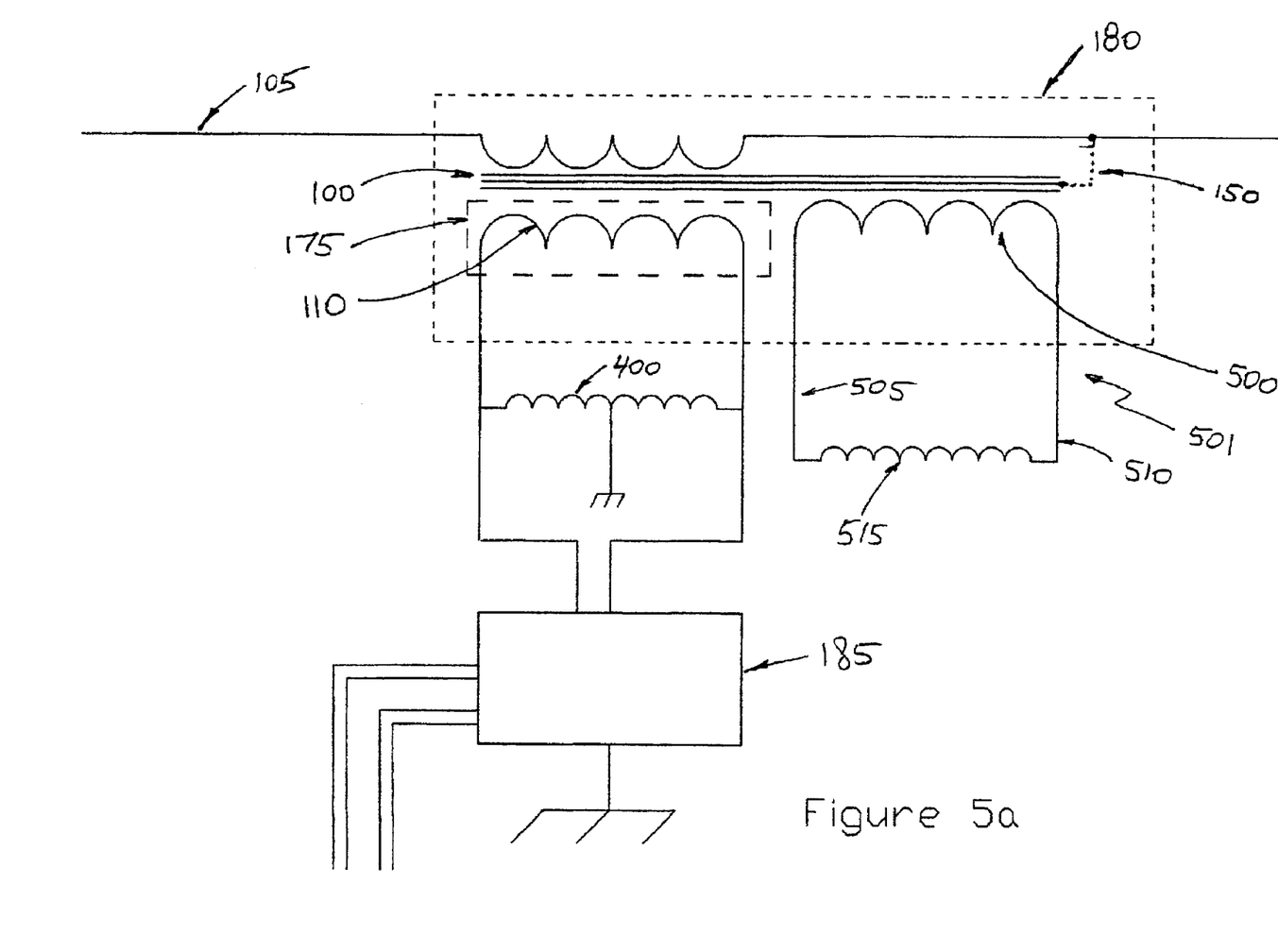
FIG. 5a is a schematic of a flux-canceling tertiary winding with a choke, and its application in an inductive coupler.

FIG. 5a is an illustration of a circuit 501 for canceling flux in a magnetic core of an inductive coupler. Circuit 501 includes a tertiary winding 500 configured with a conductor of a cross-section of diameter comparable to phase line 105, and has leads 505 and 510 connected to a choke 515. Choke 515 is a coil, constructed of large diameter conductor, in a typical range of 7 to 11 mm with either a non-magnetic or magnetic core.

Figure 5B:
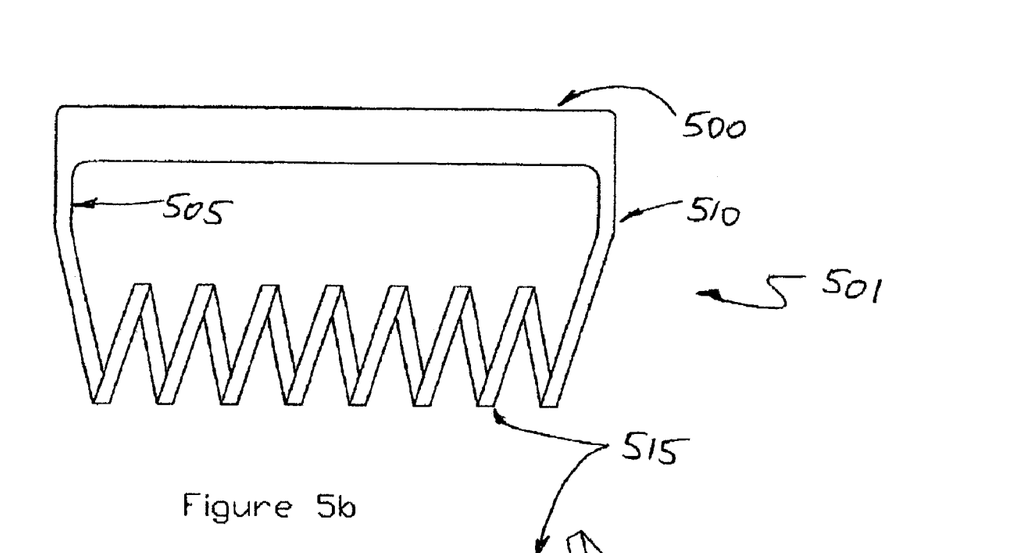
FIG. 5b is an illustration of a flux-canceling tertiary winding.
Figure 5C:
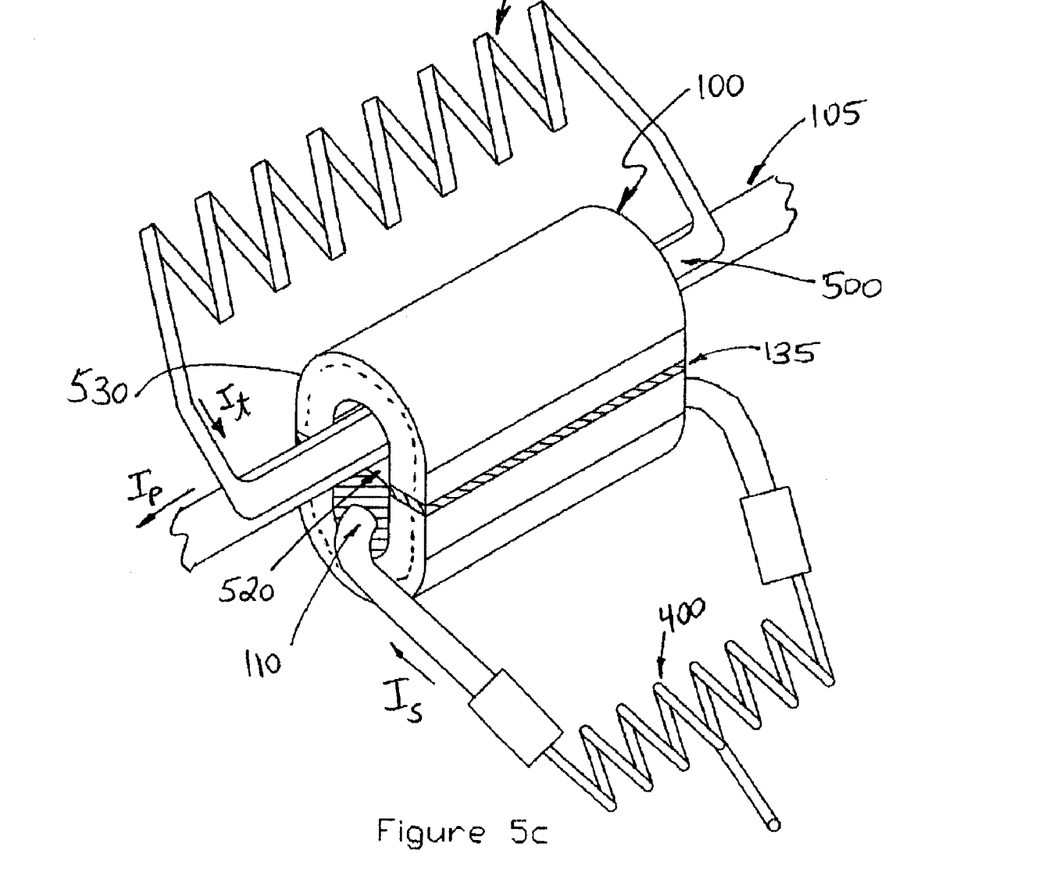
FIG. 5c is an illustration of an inductive coupler having a flux-canceling tertiary winding with a choke.

FIG. 5b is an illustration of a device that can implement circuit 501 prior to installation in an inductive coupler. FIG. 5c illustrates a positioning of tertiary winding 500, inserted through the upper portion of a core aperture 520 adjacent to a phase line 105. Note that tertiary winding 500 is not embedded in insulation 175 and is thus cooled by the surrounding air, avoiding overheating that would have occurred had it been embedded in insulation 175.

Tertiary winding 500 contacts phase line 105 inside aperture 520, energizing tertiary winding 500, and putting tertiary winding 500 at the same voltage as phase line 105. The components of circuit 501 are constructed without any sharp points, thus avoiding corona discharge.

When tertiary winding 500 and choke 515 are installed, secondary current $I_s$ in secondary winding 110 includes a flux-canceling current, and an additional flux-canceling current $I_t$ flows in tertiary winding 500, both in directions opposite to the primary current $I_p$. An appropriate division of current between secondary winding 110 and tertiary winding 500, which avoids overheating in secondary winding 110, is provided by designing tertiary winding 500 and choke 515 to have a much lower total impedance than that of secondary winding 110 and its choke 400.

Higher current levels may be supported by using magnetic cores 100 that saturate at higher levels of magnetomotive force and with a longer magnetic path 530, and increasing the thickness of gapping material 135.

Figure 6:
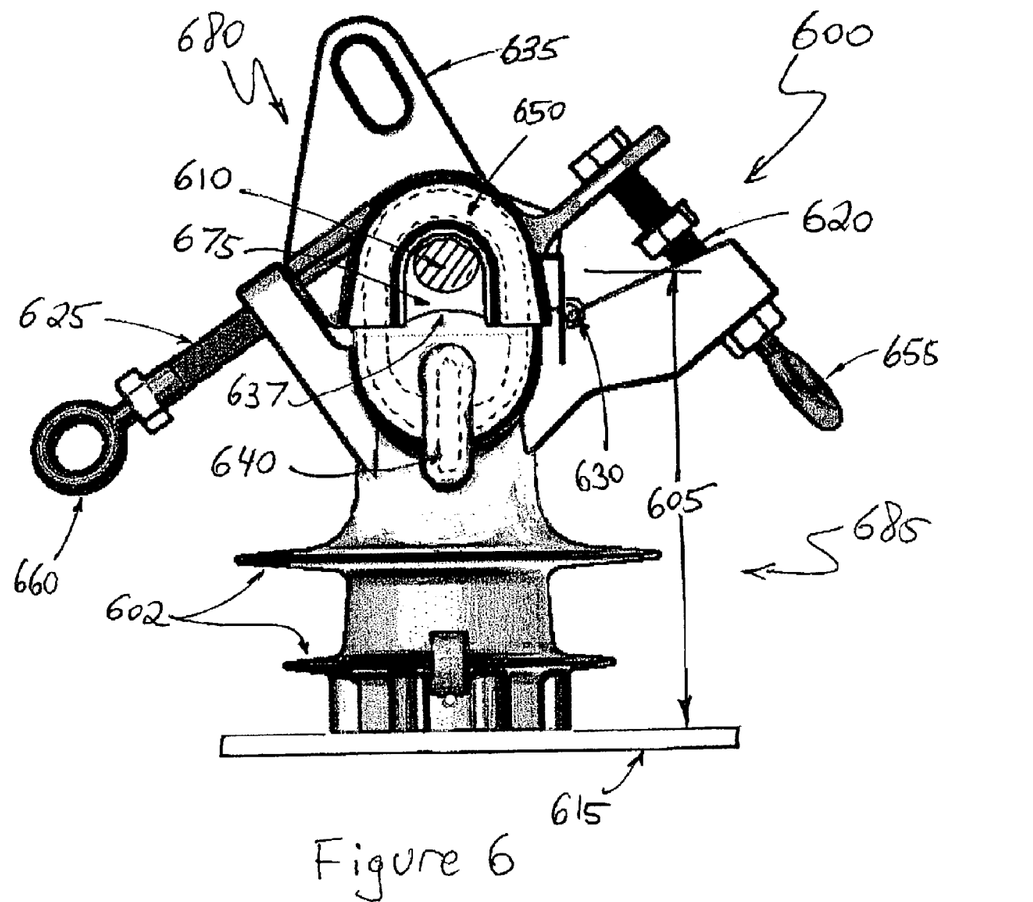
FIG. 6 is an illustration of an embodiment of an inductive coupler.

FIG. 6 is an illustration of an embodiment of an insulated inductive coupler 600. Coupler 600 includes sheds 602 and a support bracket 615.

Sheds 602 provide a sufficiently long leakage path between phase line 610 and grounded objects installed below support bracket 615. For devices rated for 15 kilovolt-class phase conductors, the leakage path around sheds 602 may be 50 cm. Higher voltages would require increasing this distance, along similar guidelines to those used in designing pin insulators. A direct distance 605 from a phase line 610 to any exposed grounded conducting surface must be great enough to prevent breakdown under simulated lightning pulse exposure of 125 kilovolts pulse of 1.2 microseconds rise time and 50 microseconds fall time, for 15 kilovolt class phase conductors. Support bracket 615, or an anti-sway bracket, at the bottom of coupler 600 is no closer than distance 605 of at least 22 cm from phase line 610, and is either constructed of dielectric material or covered with insulation. Again, for higher phase voltages, this distance 605 must be increased accordingly.

As illustrated in FIG. 6, an insulated secondary winding 640 is shown passing through an aperture 675 of cores 650. A top surface 637 of insulated secondary winding 640 may be slightly convex to prevent rainwater accumulation.

A handle 635 is molded into an upper part 680 of coupler 600, to provide a means of lifting and positioning coupler 600 onto phase line 610. Handle 635 is large enough to accommodate a gloved hand for gloved linemen wishing to perform a manual attachment. Alternatively, handle 635 provides a loop that can be grasped by a hook of a hot stick insulated tool, for maneuvering coupler 600 with the hot stick.

A jackscrew 620 opens coupler 600 in conjunction with a hinge 630, and a locking screw 625 ensures that upper part 680 will not detach from a lower part 685. An eyelet 655 of jackscrew 620, and an eyelet 660 of locking screw 625 accommodate both gloved hands and hot sticks.

Figure 7:
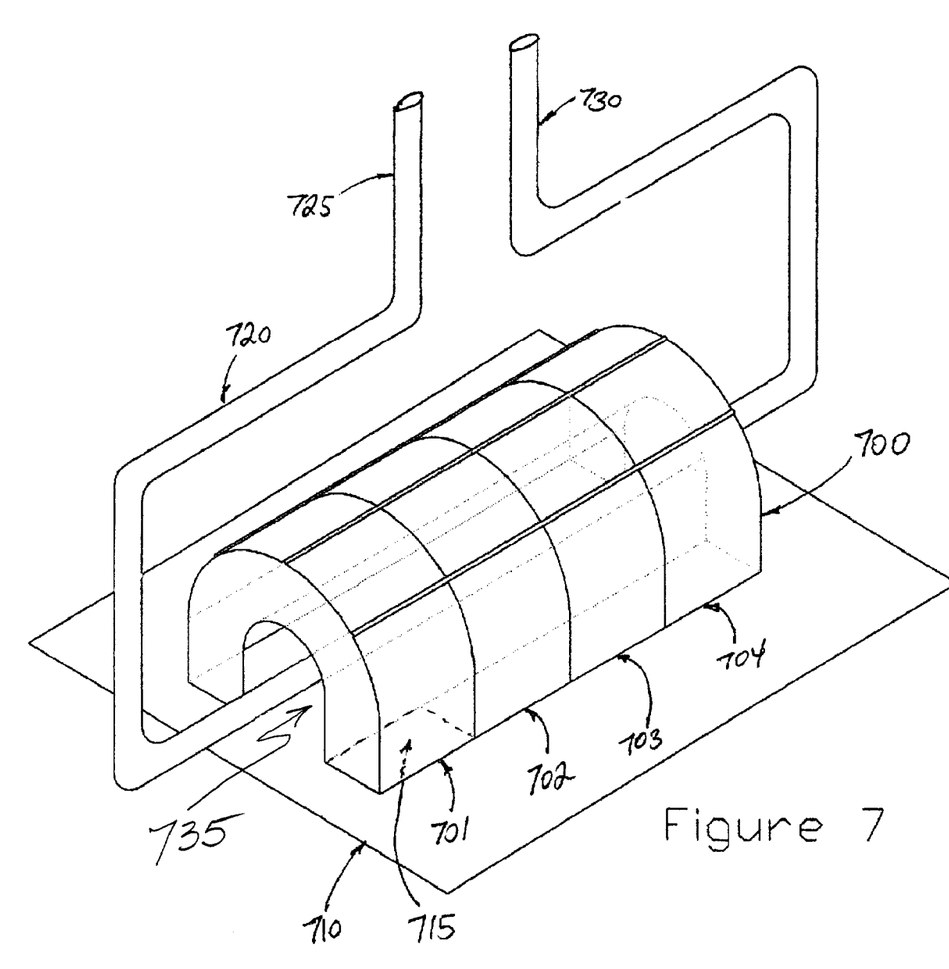
FIG. 7 is an illustration of a core, as positioned during molding.

FIG. 7 is an illustration of the proper positioning of a core section for molding during manufacturing of an inductive coupler. A plurality of core section components 701, 702, 703 and 704 are bound together, for example by gluing or by overmolding with a thin covering (shown as plastic layer 171 in FIG. 3b), forming a core section 700. During this binding, core components 701, 702, 703 and 704 are placed on a planar surface 710, to ensure that their pole faces, such as pole face 715, are aligned in a common plane, i.e., are coplanar. This alignment ensures that the upper and lower sets of pole faces (see pole faces 200 in FIG. 3b) either mate together after assembly, or else have a uniform air gap between them. One molded magnetic core section 700 is molded as part of an upper core section (e.g., upper core 125) and a second magnetic core section 700 is molded as part of lower core section (e.g., lower core section 130).

When manufacturing a lower core section, a secondary winding 720 and magnetic core section 700 are inserted into a mold (not shown) before molding. Secondary winding 720 is suspended in the mold by capturing part of its two parallel ends 725 and 730. Magnetic core section 700 is situtated over secondary winding 720 while also situating pole faces, e.g., 715, of magnetic core section 700 on planar surface 710. Secondary winding 720 is thus routed through an aperture 735 formed between planar surface 710 and magnetic core section 700. Thereafter, insulating material (not shown) is injected into aperture 735.

It should be understood that various alternatives and modifications of the teachings herein could be devised by those skilled in the art. The present invention is intended to embrace all such alternatives, modifications and variances that fall within the scope of the appended claims.

What is claimed is:

1. An inductive coupler, comprising:
   a split magnetic core having an aperture formed by a first section and a second section, wherein said aperture permits a phase line of a power line to pass therethrough as a primary winding; and
   gapping material between said first and second sections, wherein said gapping material is electrically conductive,
   wherein said second section makes electrical contact with said first section via said gapping material, and
   wherein said inductive coupler is for coupling a data signal to said phase line.

2. The inductive coupler of claim 1, further comprising a secondary circuit having a winding passing through said aperture as a secondary winding and providing a low impedance path for power frequency to an electrical ground.

3. The inductive coupler of claim 2, wherein said secondary circuit comprises a conductor that withstands a power line fault current for a period that exceeds a time required for a protective device to disconnect said power line fault current.

4. The inductive coupler of claim 2, wherein said low impedance path includes a choke having a center tap connected to said electrical ground.

5. The inductive coupler of claim 2, further comprising:
   a circuit for canceling magnetic flux having (a) a winding passing through said aperture as a tertiary winding, and (b) a choke connected to said tertiary winding,
   wherein said circuit for canceling magnetic flux has a current induced therein that flows in a direction opposite to that of primary current in said phase line when said inductive coupler is situated on said phase line.

6. The inductive coupler of claim 5, wherein said tertiary winding, within said aperture, comprises an uninsulated conductor.

7. The inductive coupler of claim 5, wherein said tertiary winding is for making electrical contact with said outer surface of said phase line.

8. The inductive coupler of claim 5, wherein said choke includes a magnetic core.

9. The inductive coupler of claim 2, further comprising:
   a circuit for canceling magnetic flux having (a) a winding passing through said aperture as a tertiary winding, and (b) a choke connected to said tertiary winding,
   wherein said first and second sections comprise a material that saturates at a level of magnetomotive force so as to limit current induced in said tertiary winding.

10. The inductive coupler of claim 1, further comprising:
    a secondary circuit having a winding passing through said aperture as a secondary winding,
    wherein said secondary winding has an outer contour having a cross-sectional dimension that is greater than or equal to about 25% of an inner diameter of said second section.

11. The inductive coupler of claim 1, wherein, when said inductive coupler is installed on said phase line, said split magnetic core has sides perpendicular to said phase line and rounded in shape so as to provide a gradually increasing radial spacing between said split magnetic core and said phase line.

12. The inductive coupler of claim 1, further comprising:
    a first plastic layer adjacent to said first section;
    a second plastic layer adjacent to said second section;
    a pin protruding from one of said first or second plastic layers; and
    a recess for receiving said pin in the other of said first or second plastic layers.

13. The inductive coupler of claim 1,
    wherein either of said first or second sections includes a pin that protrudes into said gapping material and stabilizes a position of said gapping material.

14. The inductive coupler of claim 1, further comprising:
    a circuit for canceling magnetic flux having (a) a winding embedded in insulation and passing through said aperture as a secondary winding, and (b) a choke connected to said secondary winding,
    wherein said secondary winding includes a conductor having a cross-sectional area that is great enough to prevent thermal damage to said insulation when said conductor conducts a power frequency current.

15. The inductive coupler according to claim 14, wherein said choke includes a magnetic core.

16. The inductive coupler of claim 1, further comprising:
    a circuit for canceling magnetic flux having (a) a winding embedded in insulation and passing through said aperture as a secondary winding, and (b) a choke connected to said secondary winding,
    wherein said first and second sections comprise a material that saturates at a level of magnetomotive force so as to limit current induced in said secondary winding.

17. The inductive coupler of claim 1, further comprising a loop for holding said inductive coupler.

18. The inductive coupler of claim 1, wherein said first and second sections are coated with a conductive coating.

19. The inductive coupler of claim 1, further comprising a springy conductive body being in electrical contact with said first section and for providing an electrical contact with said outer surface of said phase line.

20. An inductive coupler for coupling a data signal to a phase line of a power line, comprising:
    a split magnetic core having an aperture formed by a first section and a second section, wherein said aperture permits said phase line to pass therethrough as a primary winding; and
    a secondary circuit having a winding passing through said aperture as a secondary winding and providing a low impedance path for power frequency to an electrical ground.

21. The inductive coupler of claim 20, wherein said low impedance path includes a choke having a center tap connected to said electrical ground.

22. The inductive coupler of claim 21, wherein said secondary circuit comprises a conductor that withstands a power line fault current for a period that exceeds a time required for a protective device to disconnect said power line fault current.

23. The inductive coupler of claim 20, further comprising:
a circuit for canceling magnetic flux having (a) a winding passing through said aperture as a tertiary winding, and (b) a choke connected to said tertiary winding,
wherein said circuit for canceling magnetic flux has a current induced therein that flows in a direction opposite to that of primary current in said phase line when said inductive coupler is situated on said phase line.

24. The inductive coupler of claim 23, wherein said tertiary winding, within said aperture, comprises an uninsulated conductor.

25. The inductive coupler of claim 23, wherein said tertiary winding is for making electrical contact with said outer surface of said phase line.

26. The inductive coupler of claim 23, wherein said choke includes a magnetic core.

27. The inductive coupler of claim 20, further comprising:
a circuit for canceling magnetic flux having (a) a winding passing through said aperture as a tertiary winding, and (b) a choke connected to said tertiary winding,
wherein said first and second sections comprise a material that saturates at a level of magnetomotive force so as to limit current induced in said tertiary winding.

28. The inductive coupler of claim 20, further comprising:
a first plastic layer adjacent to said first section;
a second plastic layer adjacent to said second section;
a pin protruding from one of said first or second plastic layers; and
a recess for receiving said pin in the other of said first or second plastic layers.

29. The inductive coupler of claim 20, further comprising:
gapping material between said first and second sections,
wherein either of said first or second sections includes a pin that protrudes into said gapping material and stabilizes a position of said gapping material.

30. The inductive coupler of claim 20, further comprising:
a circuit for canceling magnetic flux having a choke connected to said secondary winding,
wherein said secondary winding, within said aperture, is embedded in insulation and includes a conductor having a cross-sectional area that is great enough to prevent thermal damage to said insulation when said conductor conducts a power frequency current.

31. The inductive coupler according to claim 30, wherein said choke includes a magnetic core.

32. The inductive coupler of claim 20, further comprising:
a circuit for canceling magnetic flux having a choke connected to said secondary winding,
wherein said secondary winding, within said aperture, is embedded in insulation, and
wherein said first and second sections comprise a material that saturates at a level of magnetomotive force so as to limit current induced in said secondary winding.

33. The inductive coupler of claim 20, further comprising a loop for holding said inductive coupler.

34. The inductive coupler of claim 1, wherein said first section makes electrical contact with an outer surface of said phase line when said inductive coupler is situated on said phase line.

* * * * *